(12) United States Patent
Kristoffersen

(10) Patent No.: US 6,664,692 B1
(45) Date of Patent: Dec. 16, 2003

(54) ELECTRICAL MACHINE

(75) Inventor: Bjorn Kristoffersen, Trondheim (NO)

(73) Assignee: Smart Motor AS, Trondheim (NO)

( * ) Notice: Subject to any disclaimer, the term of this patent is extended or adjusted under 35 U.S.C. 154(b) by 0 days.

(21) Appl. No.: 09/979,304

(22) PCT Filed: May 25, 2000

(86) PCT No.: PCT/NO00/00174
§ 371 (c)(1), (2), (4) Date: Mar. 22, 2002

(87) PCT Pub. No.: WO00/76054
PCT Pub. Date: Dec. 14, 2000

(30) Foreign Application Priority Data

May 25, 1999 (NO) ............................. 19992487

(51) Int. Cl.$^7$ ............................................... H02K 21/27
(52) U.S. Cl. ................. 310/179; 310/67 A; 310/156.37; 310/180; 310/184; 310/266
(58) Field of Search ................. 310/179, 180, 310/181, 184, 261, 266, 268, 254, 67 A, 156.32, 156.33, 156.34, 156.36, 156.37

(56) References Cited

U.S. PATENT DOCUMENTS

| | | | | |
|---|---|---|---|---|
| 3,566,165 A | * | 2/1971 | Thomas | 310/67 R |
| 3,869,626 A | * | 3/1975 | Puttock et al. | 310/152 |
| 4,710,667 A | * | 12/1987 | Whiteley | 310/268 |
| 4,774,428 A | * | 9/1988 | Konecny | 310/198 |
| 5,801,463 A | * | 9/1998 | Suzuki et al. | 310/51 |
| 5,874,795 A | * | 2/1999 | Sakamoto | 310/156.12 |
| 5,909,072 A | * | 6/1999 | Muller | 310/68 B |
| 5,977,684 A | * | 11/1999 | Lin | 310/268 |
| 6,011,337 A | * | 1/2000 | Lin et al. | 310/156.37 |
| 6,046,518 A | * | 4/2000 | Williams | 310/43 |

FOREIGN PATENT DOCUMENTS

| | | | | |
|---|---|---|---|---|
| JP | 11-98790 | * | 4/1999 | H02K/21/14 |
| JP | 11-234989 | * | 8/1999 | H02K/21/14 |
| WO | WO97/23942 | * | 7/1997 | H02K/21/24 |

OTHER PUBLICATIONS

SU 758411B Feldman et al., "Two-Phase Binary Angel Transducer . . ." Aug. 25, 1980 (abstract).*

* cited by examiner

Primary Examiner—Burton S. Mullins
(74) Attorney, Agent, or Firm—Dennison, Schultz & Dougherty

(57) ABSTRACT

A slow moving electrical machine includes an annular set of windings on iron cores of laminated sheets or pressed iron powder, and a corresponding annular set of permanent magnets, the windings being concentrated, and the iron cores having windings being arranged alternatingly with iron cores without windings. The machine has a number of grooves between the cores which is different from a number of poles of the permanent magnets, the number of grooves s and the number of poles p being defined by $|s-p|=2*m$ and $s=12*n*m$, where n and m are natural numbers. The machine is constructed and arranged for three phase operation, with serial connection of adjacent windings within a group, with $2*m$ groups of windings per phase, and with serial or parallel connection of groups of windings.

6 Claims, 2 Drawing Sheets

ELECTRICAL MACHINE

The invention relates to a slow moving electrical machine, such as a motor or generator or a combined motor-generator, as described in the introductory part of claim 1.

BACKGROUND OF THE INVENTION

A slow moving electrical machine may be used for different purposes, e.g. for land or sea vehicles, for hoisting and lifting equipment and in some cases also for power generating. Such machines are known as "permanently magnetized synchronous machines" (PMSM). But some of these machines are not suitable for an intended, specific purpose, particularly depending on the conditions of efficiency and space demand.

A growing demand for energy economization, due to energy supply and energy costs, exists. This particularly applies to motors/generators intended for vehicles and other purposes being powered by batteries. To reduce the battery capacity required and extend the operational range or the power output of battery powered applications. The highest efficiency possible is necessary.

In some situations, the need for space economy is also a critical factor.

SUMMARY OF THE INVENTION

The main object of the invention is to create an improved electrical machine, particularly a motor, which is more energy economical and space saving than prior art machines for similar purposes. Generally, it is an object to create an energy efficient electrical machine, which can compete with existing synchronous machines for industrial purposes, but at the same time the machine should be suitable for being powered by a battery, to be used for operating vehicles and other equipment without continuos more power.

It is particularly important to provide an electrical machine suitable for slow rotation, with electronic drive control, to avoid the need for gears. It is also desirable to be able to scale the machine within large limits according to the purpose and also be able to use identical components for different sizes.

Other objects linked to particular areas of use will appear from the description of embodiments to follow.

This machine has proved suitable as a motor for e.g. vehicles, thrust propellers and winches. It can be manufactured in different sizes. Within one size range, identical elements can be used for different purposes, e.g. powder cores, magnets, iron yokes for magnets, coils and the plastic frames for the powder cores. This standardizing of elements will reduce the manufacturing costs.

It is possible to adapt an electrical machine according to the invention, particularly as a motor, to different purposes, e.g. for powering wheel chairs and other vehicles, for powering thrusters on ships, for winches and for process applications demanding slow rotation. The need for gears is eliminated, and the costs will be lower than for corresponding known power units. The rotational control and the conversion from motor to generator application in combined use can be achieved with electronic controls based on known principles, which in most cases can be incorporated into the housing of the machine.

For motor applications, the electrical machine according to the invention has several advantages.

low vibrations under operation, and thus low noise, high starting torque high efficiency, particularly when using laminated cores, high flexibility in design, particularly with regard to the main dimensions it can easily be provided with double or multiple stator and can thus be easily scaled up based on standard components, particularly powder cores, magnets, iron yokes, coils and forms with coils.

The invention will bring the greatest advantage used in connection with an axial field, i. e. axially magnetizing. But it will also work with a radial field, when easy mounting and demounting is particularly important.

Further details of the invention will appear from the following description of embodiments.

BRIEF DESCRIPTION OF THE DRAWINGS

The invention is described in more detail with reference to the accompanying drawings, wherein.

DESCRIPTION OF THE PREFERRED

Figure 1:
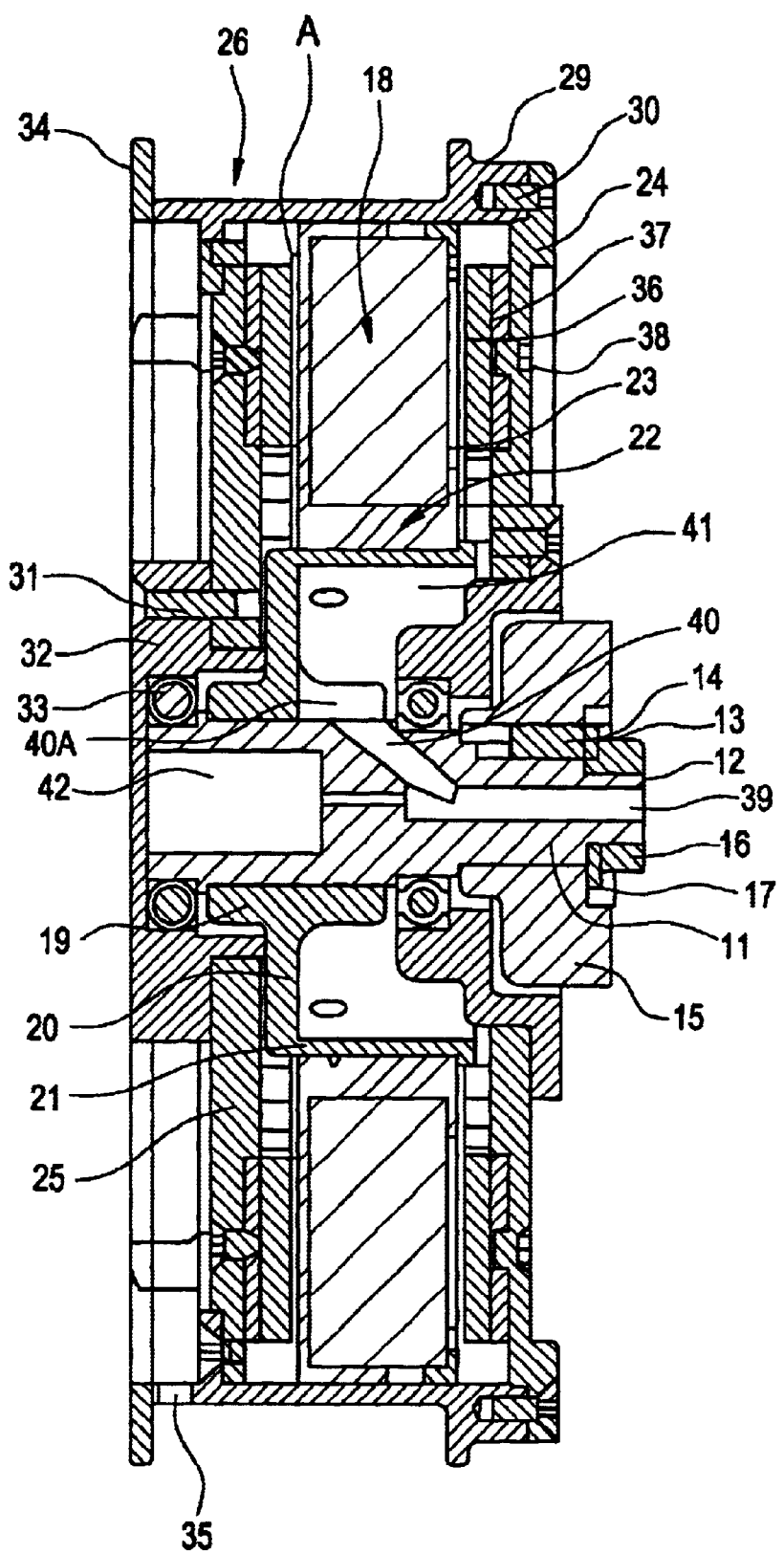
FIG. 1 shows an axial section of an embodiment adapted for use as a slow rotating integrated wheel motor for a vehicle. This embodiment may be applicable to wheel chairs, cars or other transport purposes.

The electrical machine of FIG. 1 is a motor suitable for powering a vehicle, such as a wheel chair, a car or another transport means with wheels. It may be provided for periodical use as generator, e.g. at braking. The motor includes a shaft 11 that, by an inner gradually reduced end 12 with a key groove 13 and a key 14 is held by a carrier arm 15 or corresponding bracket on the vehicle. The locking is provided with a nut 16 with a washer 17.

The shaft 11 carries a stator part 18 and a rotating part, both comprising multiple components. The stator part 18 includes a hub 19 shrunk on the shaft with a radial central flange 20 emerging into and carrying a cylindrical stator bushing 21 extending towards the carrier arm 15, but ending in an axial distance from this element. The stator bushing 21 has a moulded form 22 of plastic with inlaid windings 23 distributed around the circumference. In the illustrated embodiment, eighteen separated stator coils 23 are provided. The stator coils have, in radial section, a rectangular shape which will cooperate with a rotor part described below. Details of the stator windings will also be further described.

As carrier for the rotor and a wheel, an annular inner disk 24 and an annular outer disk 25 are provided, the outer disk being integrated with a generally cylindrical rim 26 carried also by the inner disk.

The inner disk 24 is carried by a bearing housing 27 with a bearing 28 mounted on the shaft 11 close to the carrier arm 15. At its circumference the inner disk 24 is connected to a flange 29 of the rim 26 by screws 30.

The outer disk 25 is mounted on the end of the hub 19 and is connected with screws 31 to a central enclosure 32 also providing housing for a bearing 33 on the end of the shaft 11 .The outer end of the rim 26 has a second flange 34 which together with the inner flange 29 provides space for a tire (not shown) or another wheel track. For accommodating a tube valve, the rim 26 has an opening 35 adjoining the outer flange 34.

The disks 24 and 25 function as a motor housing and rotor carrier, each having a set of rotor segments or magnets 36.

The magnets 36, thirty-eight on each side, of the illustrated embodiment, can be manufactured of a known permanent magnetic material. They are carried by an iron ring 37 mounted on the respective disks 24, 25 with screws 38 from the outside. It is important that the number of magnets are different from the number of grooves between the iron elements of the windings.

Between the magnets 36 and the stator form 22, an airgap A is present. The airgap is permanent, partly due to the outer arrangement of the bearing 33, which provides high stability.

For introducing a power cable (not shown) to the windings 23, the shaft 11 has an axial bore 39 which through an inclined bore 40 is communicating with the a space 41 inside the stator bushing. A continued bore through the shaft communicates with a space 42 at the end of the shaft, and provides for accommodating parts of the electronic power control circuits.

The space 41 within the stator bushing 21 can also accommodate components of the control circuit. A braking device can be arranged in the free space between the disks 24, 25, for certain purposes, e.g. for the use in vehicles.

Figure 2:
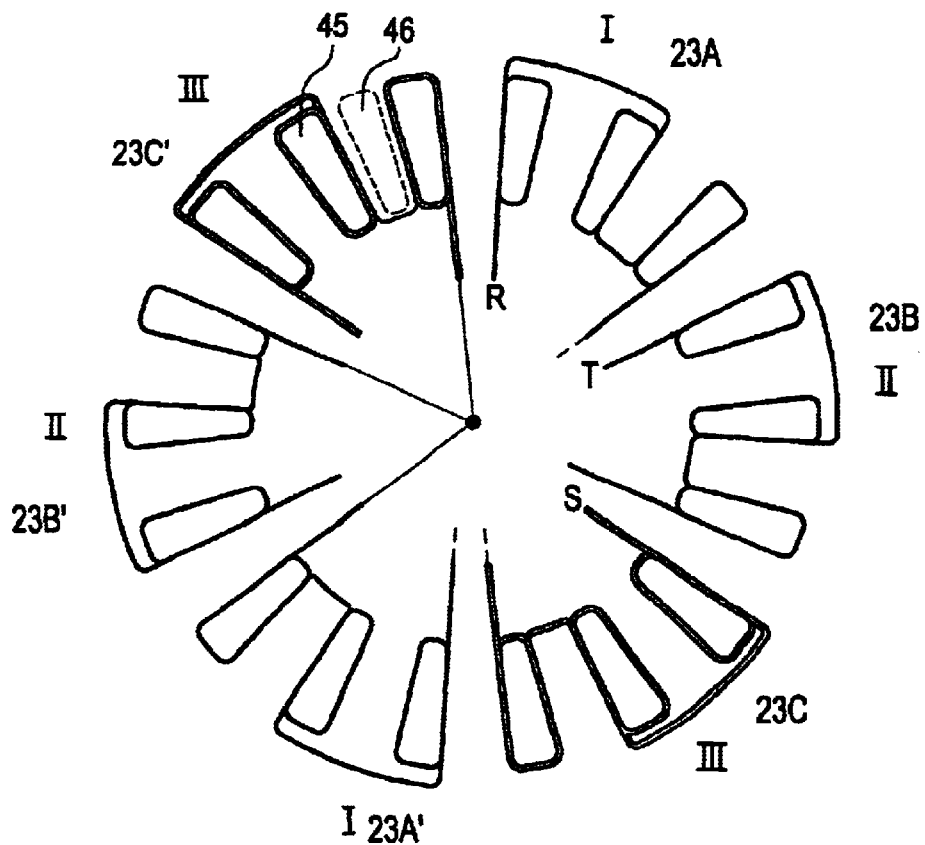
FIG. 2 shows a schematic section through the stator windings with cores of iron powder.

In FIG. 2 the windings of the axial machine of FIG. 1 are shown schematically, with three double sets of stator windings 23A, 23B and 23C, respectively 23A', 23B' and 23C', which are mounted on iron cores 45, prepared from laminated sheets or iron powder. The coils are arranged distributed and not in grooves. Each set of windings encloses three iron cores with a free iron core 46 arranged interchangeably. Thus there are thirty-six iron cores 45. Generally, the number of grooves s and the number of poles p follows the equations $$|s-p|=2*m \text{ and } s=12*n*m$$

n and m being natural numbers, making 2*m such groups per phase, to be connected in series or parallel.

The set of windings can be connected in series as shown or in parallel, in both cases for 3 phase feeding (RST).

The embodiment with iron powder has a lower efficiency than corresponding elements prepared with sheet lamells, but this is not necessary for some equipment with a restricted time of use. On the other hand, it will lower the operating costs substantially.

The stator windings 23 on the iron cores 45 are molded into a plastic component or stator form 23 (FIG. 1).

Figure 3:
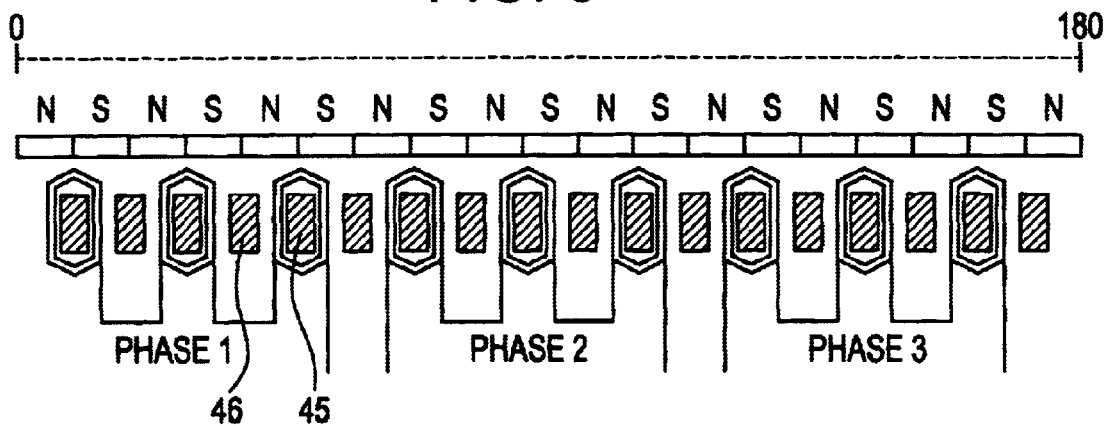
FIG. 3 shows a diagram for the winding of FIG. 2.

In FIG. 3 a winding diagram for the winding of FIG. 2 is shown, with at set of windings for each phase and with the ends prepared for connection in series or parallel. On the drawing n=3 and m=1.

Iron cores in the form of conventional laminates can be used. This provides a higher efficiency but at somewhat higher costs. The purpose and the utilization will determine which solution is optimal. The use and design can be modified according to various needs. In one embodiment, the disks 24, 25 with the outer rim 26, can be attached to a carrier, while the shaft 11 is connected to a unit to be rotated.

What is claimed is:

1. Slow moving electrical machine, comprising an annular set of windings on iron cores of laminated sheets or pressed iron powder, and a corresponding annular set of permanent magnets, the windings being concentrated and the machine having a number of grooves between the cores which is different from a number of poles of the permanent magnets, the number of grooves s and the number of poles p being defined by $|s-p|=2*m$ and $s=12*n*m$, where n and m are natural numbers, the iron cores being arranged such that iron cores having windings alternate with iron cores without windings, the cores being disposed in groups corresponding to three phase operation of the machine with 2*m groups of windings per phase, with adjacent wound cores within a group being connected in series, and groups of cores being connected in series or in parallel.

2. Electrical machine according to claim 1, comprising an axial field, wherein at least two rotors are arranged side by side, to create multiple airgaps.

3. Electrical machine according to claim 1, comprising fixed stator windings, wherein:

the stator windings are carried by a tubular carrier including a cylindrical form of a non-conductive material, and the permanent magnets are attached in two symmerically arranged annular arrays.

4. Electrical machine according to claim 3, wherein the annular arrays are attached to a pair of annular disks carrying therebetween a rim of a wheel, the tubular stator carrier being attached to a fixed carrier shaft.

5. Electrical machine according to claim 1, which is a motor, a generator or a combined motor-generator.

6. Electrical machine according to claim 1, which is a permanently magnetized synchronous machine (PMSM) for sinusoidal voltage.

* * * * *